United States Patent
Weiss et al.

(10) Patent No.: US 7,162,493 B2
(45) Date of Patent: Jan. 9, 2007

(54) SYSTEMS AND METHODS FOR GENERATING AND PROVIDING PREVIEWS OF ELECTRONIC FILES SUCH AS WEB FILES

(75) Inventors: Yuval Weiss, Yavne (IL); Ori Eyal, Yavne (IL)

(73) Assignee: Penta Trading Ltd., London (GB)

( * ) Notice: Subject to any disclaimer, the term of this patent is extended or adjusted under 35 U.S.C. 154(b) by 324 days.

(21) Appl. No.: 10/203,645

(22) PCT Filed: Feb. 22, 2001

(86) PCT No.: PCT/IL01/00172

§ 371 (c)(1),
(2), (4) Date: Aug. 22, 2002

(87) PCT Pub. No.: WO01/63919

PCT Pub. Date: Aug. 30, 2001

(65) Prior Publication Data

US 2003/0014415 A1  Jan. 16, 2003

Related U.S. Application Data

(60) Provisional application No. 60/184,331, filed on Feb. 23, 2000, and provisional application No. 60/246,600, filed on Nov. 8, 2000.

(51) Int. Cl.
*G06F 17/30* (2006.01)

(52) U.S. Cl. .............................. 707/104; 707/3; 707/10; 707/102

(58) Field of Classification Search .................... 707/3, 707/10, 104, 102, 523, 218, 228, 104.1; 345/335; 715/501.1, 513; 709/219
See application file for complete search history.

(56) References Cited

U.S. PATENT DOCUMENTS

| | | | |
|---|---|---|---|
| 5,434,678 A | 7/1995 | Abecassis | |
| 5,861,906 A | 1/1999 | Dunn et al. | |
| 5,945,987 A | 8/1999 | Dunn | |
| 5,973,692 A | 10/1999 | Knowlton et al. | |
| 6,011,537 A | 1/2000 | Slotznick | |
| 6,016,494 A | 1/2000 | Isensee et al. | |
| 6,028,604 A | 2/2000 | Matthews, III et al. | |
| 6,061,719 A * | 5/2000 | Bendinelli et al. | 709/218 |
| 6,072,934 A | 6/2000 | Abecassis | |
| 6,101,510 A | 8/2000 | Stone et al. | |
| 6,122,643 A | 9/2000 | Paik et al. | |

(Continued)

FOREIGN PATENT DOCUMENTS

| | | |
|---|---|---|
| EP | 0961212 A2 | 12/1999 |
| WO | WO 99/62033 A1 | 12/1999 |
| WO | WO 02/39207 | 5/2002 |

OTHER PUBLICATIONS

R.R. Hightower, et al Graphical Multiscale Web Histories: A Study of PadPrints, Hypertext '98. The 9th ACM Conference on Hypertext and Hypermedia. Pittsburgh, PA, Jun. 20–24, 1998, ACM Conference on Hypertext and Hypermedia, New York, NY: ACM, US, Jun. 20, 1998, pp. 58–65.

*Primary Examiner*—Thuy N. Pardo
(74) *Attorney, Agent, or Firm*—G.E. Ehrlich (1995) Ltd.

(57) ABSTRACT

A system for previewing contents of Web files is provided. The system includes a computing platform for executing a previewing application being designed and configured for: (a) retrieving at least a portion of the contents and/or source code of a Web file; and (b) generating a preview of the contents of said Web file, said preview presenting at least a portion of the content of said Web file.

29 Claims, 9 Drawing Sheets

(8 of 9 Drawing Sheet(s) Filed in Color)

U.S. PATENT DOCUMENTS

| | | | | |
|---|---|---|---|---|
| 6,128,663 A | * | 10/2000 | Thomas | 709/228 |
| 6,134,566 A | | 10/2000 | Berman et al. | |
| 6,295,057 B1 | * | 9/2001 | Rosin et al. | 345/335 |
| 6,366,923 B1 | * | 4/2002 | Lenk et al. | 707/104.1 |
| 6,374,260 B1 | * | 4/2002 | Hoffert et al. | 707/104.1 |
| 6,496,857 B1 | * | 12/2002 | Dustin et al. | 709/219 |
| 6,535,896 B1 | * | 3/2003 | Britton et al. | 707/523 |
| 6,569,206 B1 | * | 5/2003 | Dey et al. | 715/501.1 |
| 6,605,120 B1 | * | 8/2003 | Fields et al. | 715/513 |
| 2001/0014891 A1 | * | 8/2001 | Hoffert et al. | 707/104.1 |

* cited by examiner

SYSTEMS AND METHODS FOR GENERATING AND PROVIDING PREVIEWS OF ELECTRONIC FILES SUCH AS WEB FILES

RELATED PATENT APPLICATIONS

This application is a National Phase Entry of PCT/IL01/00172 filed 22 Feb. 2001, which claims priority from U.S. Provisional Patent Application Ser. No. 60/184,331 filed 23 Feb. 2000 and U.S. Provisional Patent Application Ser. No. 60/246,600 filed 8 Nov. 2000.

FIELD AND BACKGROUND OF THE INVENTION

The present invention relates to a searchable database and to systems for generating and utilizing same.

With the advent of the World Wide Web, individuals have at their disposal vast amounts of information on a variety of topics. As such, at present, the World Wide Web represents the largest single searchable database.

However, since such data is dispersed among a staggering number of Web sites, searching for such information can be a daunting task. To facilitate Web searching, a number of search tools, termed search engines, have been created, e.g. Google (www.google.com), Lycos (www.lycos.com), Alta Vista (www.altavista.com), etc.

The use of such search engines enables a user to receive information relating to Web accessible files of interest such as Web pages in accordance with a search query.

Most Internet search engines search for Web files, such as Web pages, video files (e.g., QuickTime™ movies), or music files (e.g., MP3). The results returned by the search engine (the result list) is a list of hyperlinks, that link to the Web files (e.g., Web pages) most relevant to the user's query(s).

Search engine queries are typically effected via keywords, optionally separated by Boolean operators (and, or, not), topics, such as, for example searching through a specific topic, or an index, which provides access to a specific topic.

For example, in keyword searches a user querying for "sports and (football or basketball) but not soccer" would typically receive a list of links to Web pages which contain the word "sports" and also contain either the word "football" or the word "basketball" (or both) but which do not contain the word "soccer".

To enable searching, search engines build up databases, which index information on Web files. Such databases are generated by "Web spiders" (also known as "Web robots", "Web crawlers", "Web agents", etc.) which constantly scan the World Wide Web in a random, semi-random, or rule-based manner.

Web spiders are computer programs that autonomously connect to World Wide Web addresses and categorize the information contained therein according to keywords, keyword frequency, font sizes, word placement inside documents, titles, images found, date of last modification, and/or any additional criteria. The categorized information generated is then stored by the search engine database.

Some search engines, which are referred to as "meta search engines" collect and display search result provided by one or more search engines (possibly after sorting and removing duplicate results). Examples include, MetaCrawler (www.metacrawler.com) and the like.

Thus, following query entry, a search engine uses the categorized information stored in its database to locate Web files such as Web pages of relevance. Links to Web pages of relevance are then presented to the user as a list (the result list) which includes a link to the Web page and typically also a short summary describing the Web file; the results list is typically sorted based on match accuracy.

Although such search engines facilitate World Wide Web searching, querying for specific information is oftentimes a trying experience, even when using the most sophisticated search tools available.

Because of the vast amount of information and of the dispersed nature thereof, search results are oftentimes either not specific enough or not accurate.

For example, keyword searches may yield irrelevant or no results if the defined keyword is too specific, or they can yield numerous results if the keywords used are too generic.

In any case, a user must either broaden the search or be forced to download numerous Web files in order to sort and uncover the information sought after.

In the latter case, such downloading and sorting can be a frustrating and time consuming endeavor especially in cases where the information sought after is not uncovered.

Oftentimes, even in searches which seemingly provide good results, download of multiple Web files is required since the information available in the summary of each result is not sufficient for determining the relevance of the Web file to the query made.

In addition, in the case of Web page searches, a user often accesses irrelevant or slightly relevant Web pages resulting from a search query in efforts to possibly uncover more relevant links within these pages, a practice which further prolongs a search and adds to the frustration of the user.

Another common problem encountered by users searching through the Web arises from the existence of several different hypertext links which point to the same Web page or site. Such duplicate links oftentimes contribute to redundancy in search results.

Yet another common problem encountered by users searching the Web arises from "broken" hyperlinks which appear in a search results list. Such hyperlinks, which cannot be used to link to the site they represent because that site is down, or no longer available increase the frustration experienced by users.

There is thus a widely recognized need for, and it would be highly advantageous to have, a system and method which would enable a user to rapidly asses the accuracy, relevancy, and content of results obtained from a search query and to easily access related Web files such as Web pages even when contained within a Web page directly uncovered by the search query.

Surfing the World Wide Web is oftentimes is often a tedious task as connectivity to some addressed servers may prove time inefficient or non-available, depending on, user load, maximal bandwidth, presently available bandwidth and other factors.

There is thus a widely recognized need for, and it would be highly advantageous to have, a system and method which will allow efficient Web surfing at all times.

SUMMARY OF THE INVENTION

According to one aspect of the present invention there is provided a system for previewing contents of electronic files, the system comprising a computing platform for executing a previewing application being designed and configured for: (a) retrieving at least a portion of the contents and/or source code of an electronic file; and (b) generating a preview of the contents of the electronic file, the preview presenting at least a portion of the contents of the electronic file.

According to further features in preferred embodiments of the invention described below, the electronic file includes at least one file type selected from the group consisting of text type electronic files, image type electronic files, olfactory type electronic files and multi-type electronic files.

According to still further features in the described preferred embodiments the electronic file includes audio content.

According to still further features in the described preferred embodiments the preview includes a sample of the audio content, the sample of the audio content is of reduced quality and/or file size as compared to the electronic files.

According to still further features in the described preferred embodiments the electronic file includes video content.

According to still further features in the described preferred embodiments the preview includes a sample of the video content, the sample of the video content is of reduced quality and/or file size as compared to the electronic file.

According to still further features in the described preferred embodiments the electronic file is a Web file.

According to still further features in the described preferred embodiments the preview is an image presenting at least a portion of the Web page.

According to still further features in the described preferred embodiments the electronic file is stored by the computing platform.

According to still further features in the described preferred embodiments the electronic file is stored by at least one additional computing platform capable of communicating with the computing platform.

According to still further features in the described preferred embodiments the computing platform is further designed and configured for converting the at least a portion of the contents and/or source code of the electronic file retrieved thereby from a first file type to a second file type prior to, during or following generating the preview of the contents of the electronic file.

According to still further features in the described preferred embodiments the preview is an editable file.

According to still further features in the described preferred embodiments the preview is of a file size substantially smaller than that of the electronic file.

According to still further features in the described preferred embodiments the computing platform is further designed and configured for storing the preview generated thereby.

According to still further features in the described preferred embodiments the at least a portion of the contents and/or source code of the electronic file is retrieved from at least one user client communicating with the computing platform.

According to still further features in the described preferred embodiments the at least a portion of the contents and/or source code of the electronic file is retrieved from a server being in communication with the computing platform.

According to still further features in the described preferred embodiments the system further comprising at least one additional computing platform being in communication with the computing platform, the at least one additional computing platform storing links to the electronic files.

According to still further features in the described preferred embodiments the at least one additional computing platform executes a search engine application capable of providing the links to the electronic files as part of a search result list.

According to still further features in the described preferred embodiments the at least one additional computing platform is capable of storing the preview generated by the computing platform.

According to another aspect of the present invention there is provided a method of previewing contents of a Web file comprising: (a) retrieving at least a portion of the contents and/or source code of the Web file; and (b) generating a preview of the contents of the Web file, the preview presenting at least a portion of the contents.

According to still further features in the described preferred embodiments step (a) is effected by linking to the Web file via a link thereof and downloading the contents and/or the source of the Web file.

According to still further features in the described preferred embodiments the link is included in a results list of a Web search.

According to still further features in the described preferred embodiments the preview is generated in a manner enabling embedding of activatable links therein.

According to still further features in the described preferred embodiments the activatable links are hyperlinks.

According to still further features in the described preferred embodiments the preview includes an activatable link to the content of the Web file.

According to yet another aspect of the present invention there is provided a system for previewing contents of Web files, the system comprising a computing platform for executing a previewing application being designed and configured for: (a) retrieving at least a portion of the contents and/or source code of a Web file; and (b) generating a preview of the contents of the Web file, the preview presenting at least a portion of the content of the Web file.

According to still further features in the described preferred embodiments the Web file is a Web page.

According to still further features in the described preferred embodiments the system further comprising a server being for providing a link to the Web file.

According to still further features in the described preferred embodiments the link is a hyperlink representing a Web address of the Web file.

According to still further features in the described preferred embodiments the server employs a search engine application and further wherein the hyperlink is presented thereby as a result of a search query.

According to still further features in the described preferred embodiments the system further comprising at least one additional computing platform being capable of accessing and optionally displaying the preview generated by the computing platform.

According to still further features in the described preferred embodiments the Web file includes audio content.

According to still further features in the described preferred embodiments the preview includes a sample of the audio content.

According to still further features in the described preferred embodiments the sample is of reduced quality and/or size as compared to the Web file.

According to still further features in the described preferred embodiments the Web file includes video content.

According to still further features in the described preferred embodiments the preview includes a sample of the video content.

According to still further features in the described preferred embodiments the sample is of reduced quality and/or size as compared to the Web file.

According to still further features in the described preferred embodiments the preview is a viewable image.

According to still further features in the described preferred embodiments the image is a thumbnail image.

According to still further features in the described preferred embodiments the image is scaleable without substantial loss of quality.

According to still further features in the described preferred embodiments at least a portion of the image is in a vector format.

According to still further features in the described preferred embodiments the image includes activatable links embedded therein.

According to still further features in the described preferred embodiments the activatable links are hyperlinks.

According to still further features in the described preferred embodiments the Web file is stored by at least one additional computing platform capable of communicating with the computing platform.

According to still further features in the described preferred embodiments the computing platform is further designed and configured for converting the at least a portion of the contents and/or source code of the Web file retrieved thereby from a first file type to a second file type prior to, during or following generating the preview of the contents of the Web file.

According to still further features in the described preferred embodiments the computing platform is further designed and configured for storing the preview generated thereby.

According to still further features in the described preferred embodiments the at least a portion of the contents and/or source code of the Web file is retrieved from at least one user client communicating with the computing platform.

According to still further features in the described preferred embodiments the at least a portion of the contents and/or source code of the Web file is retrieved from a server being in communication with the computing platform.

According to still further features in the described preferred embodiments the system further comprising at least one additional computing platform being in communication with the computing platform, the at least one additional computing platform storing links to the Web files.

According to still further features in the described preferred embodiments the at least one additional computing platform executes a search engine application capable of providing the links to the Web files as part of a search result list.

According to still further features in the described preferred embodiments the at least one additional computing platform is a server or a user client.

According to still another aspect of the present invention there is provided a computer readable storage media comprising a database including a plurality of records each record being a preview of a content of an electronic file.

According to still further features in the described preferred embodiments the electronic file is selected from the group consisting of a Web page, an audio file, a video file and a text file.

According to an additional aspect of the present invention there is provided a method of previewing results of a search query comprising: (a) retrieving at least a portion of the contents and/or source code of at least one search result file; and (b) generating a preview of the contents of the at least one search result file, the preview presenting at least a portion of the contents of the at least one search result file.

According to still further features in the described preferred embodiments the search result file is a Web page included in a results list of a Web search.

According to yet an additional aspect of the present invention there is provided a system enabling a user to surf the World Wide Web, the system comprising: (a) a database server including previews of Web pages each of the previews presenting at least a portion of a content of a Web page; and (b) at least one user client being in communication with the database, the at least one user client being capable of accessing and displaying each of the previews thereby enabling a user of the at least one user client to surf the World Wide Web.

According to still further features in the described preferred embodiments at least one of the previews is generated by the database server according to a user command.

According to still further features in the described preferred embodiments the activatable link is a hyperlink of a Web page.

According to still further features in the described preferred embodiments activation of the hyperlink results in a display of a preview of a content of a Web page represented by the hyperlink.

According to still further features in the described preferred embodiments activation of the hyperlink results in access to a Web page represented by the hyperlink.

According to still an additional aspect of the present invention there is provided a method of displaying Web pages comprising: (a) providing a thumbnail image of at least a portion of a Web page; and (b) enabling resizing of the thumbnail image in response to a command.

According to still further features in the described preferred embodiments the method further comprising the step of providing a second thumbnail image of an additional Web in response to an activation of an activatable link embedded within the thumbnail image.

The present invention successfully addresses the shortcomings of the presently known configurations by providing a database and method and system utilizing same, which can be utilized, for example, to preview the content of Web files while conducting searches and/or while surfing.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1a is a black box diagram illustrating one embodiment of the system of the present invention;

FIG. 1b is a black box diagram illustrating another embodiment of the system of the present invention; and FIGS. 2–9 represent a sequence of images which illustrate a Web search as conducted using the system and method of the present invention.

DESCRIPTION OF THE PREFERRED EMBODIMENTS

Figure 1A:
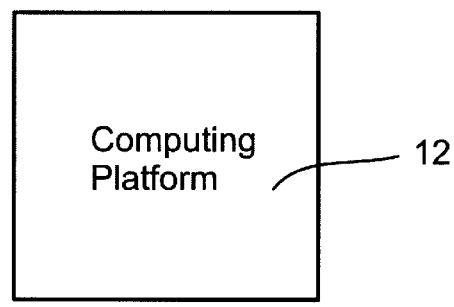

The present invention is of systems and methods for previewing the contents of electronic files including Web files such as Web pages. Specifically, the present invention enables a user conducting a Web search or surfing the Web to preview a content of a specific Web page prior to accessing it, thereby substantially enhancing the ability to screen search results for most relevant files and enhancing surfing capabilities.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1a illustrates a system for previewing contents of electronic files which is referred to hereinunder as system 10.

System 10 includes a computing platform 12 which executes a previewing application designed and configured for: (i) retrieving at least a portion of the contents and/or source code of an electronic file; and (ii) generating a preview of the contents of the electronic file.

The previews are generated by system 10 in response to a specific user query, or they can be generated automatically according to a predetermined criteria. In any case, the previews generated are preferably stored by computing platform in an accessible manner.

As used herein the phrase "computing platform" refers to a device which includes a data processor, a memory device such as, but not limited to, a magnetic, optic or optic-magnetic memory device, a power source and optionally a user input/output interface and communication capabilities.

For example, a computing platform can be a personal computer (PC) having an operating system such as DOS, Windows, OS/2™ or Linux; a Macintosh™ computer; a computer having JAVA™-OS as the operating system; and a graphical workstations such as computers made by Sun Microsystems™ or Silicon Graphics™, and any other computer having some version of the UNIX operating system such as AIX™ or SOLARIS™ of Sun Microsystems™ or any other known and available operating system.

For purposes of this specification, the term "Windows™" includes, but is not limited to, Windows2001™, Windows2000™, Windows95™, Windows 3x™ in which "x" is an integer such as "1", Windows NT™, Windows98™, Windows CE™ and any upgraded versions of these operating systems by Microsoft Corp. (USA).

As used herein the phrase "electronic file" refers to a computer readable file which includes, for example, text, image, audio, video and/or olfactory content which is created and/or saved in any computer readable/operable format. The phrase "electronic file" also refers to Web files such as Web pages, Web sites, and Web objects.

Examples of "electronic files" include, but are not limited to, Text files, Pict files, Gif files, Jpeg files, Flash files, Web pages, Web sites, music files, MP3 files, Tiff files, HTML files, WML files, XML files, Bitmap files, Wave files, Binary files, Animation files, VRML files, QuickTime™ files, Word files, Windows Media files, Real Network files, streaming files and the like.

According to preferred embodiments of the present invention, the previewing application utilized by computing platform 12 is designed and configured such that the preview generated thereby presents at least a portion of the contents of the electronic file.

For example, in the case of electronic files including audio content (e.g., MP3 music files), the preview generated can include a portion (sample) of the audio content (e.g., a few seconds of an MP3 music file), or it can include the entire file in a reduced sound quality and thus a reduced file size.

Similarly, in the case of electronic files including image or video (film or animation) content, the preview generated can include a portion (sample) of the image/video content (e.g., a few seconds of a QuickTime movie), or it can include the entire file in a reduced image or video quality and thus a reduced file size.

Preferably, in the case of text or combined electronic files (e.g., text/image), such as for example, files representing Web pages, the preview is a viewable image of at least a portion of the file.

Such a viewable image file can be created/saved by system 10 in any layout format type such as, for example, an image format type (e.g., PICT) or a vector format type, or any combination thereof.

Generation of a preview in an image format is advantageous since it allows accurate representation of elements and/or layout of the original electronic file. An image file format can simply be a "snapshot" of the original file as meant to be represented by the appropriate software application for which it was created.

Generation of a preview in a vector format is advantageous since it allows preview scaling from a small thumbnail image up to a large image (and vice versa) while preserving the quality of the text and/or other elements embedded within the preview.

Generation of a preview in a vector format which allows embedding of images is advantageous since any elements in the original file which cannot be represented in the vector preview, can be embedded into the vector preview file as an image.

According to a presently preferred embodiment of the present invention, the image preview is generated in a manner enabling the embedding of activatable links therein. Such activatable links can be used to link the image preview with the original file from which it was generated. Embedding activatable links can be achieved using image maps, and/or using a file format that can accept commands, such as HTML and/or any other suitable file formats. This feature of the present invention is further described with respect to the Web embodiment of system 10 which is detailed hereinbelow and in the Examples section which follows.

According to the present invention, the preview generated is preferably of a reduced file size as compared to the original electronic file.

This feature of the present invention is of particular advantage in cases where a user screens a large numbers of files for a file of interest, as is further described with respect to the Web searching embodiment of the present invention which is detailed hereinbelow and in the Examples section which follows.

According to another preferred embodiment of the present invention, the preview generated is of a reduced image size as compared to the original image of the original electronic file.

This feature of the present invention is of particular advantage in cases where a user screens a large numbers of files for a file of interest, as is further described with respect to the Web searching embodiment of the present invention which is detailed hereinbelow and in the Examples section which follows.

According to another preferred embodiment of the present invention, previewing application executed by computing platform 12 is further designed and configured for converting at least a portion of the contents and/or source code of the electronic file retrieved thereby from a first file type to a second file type prior to or during generating the preview.

As used herein the "type" of an electronic file refers to the application specific format in which the file is generated/saved.

For example, a preview of an MP3 music file can be generated/saved in a WAVE music file format, or a preview of a QuickTime™ movie file can be generated/saved in a MOV movie file format.

This feature of the present invention allows a user of system 10 to preview contents of electronic files which cannot be accessed (opened) for a lack of an appropriate software application.

The "type" of an electronic file can also refer to the layout format type (hierarchical, image or vector). For example, the previewing application can convert the content retrieved thereby from a hierarchical format (e.g., HTML) to an image and/or vector format which enables to store and present such previews as scaleable images as is further described herein.

According to one aspect of the present invention, system 10 can be utilized to preview contents of electronic files which are stored by computing platform 12.

For example, a user of computing platform 12 which in this case can be a user client such as a personal computer, can preview text, music, olfactory and/or video files stored in a directory including a plurality of files. Such previewing substantially enhances the ability of a user to locate a file of interest from a plurality of files.

Figure 1B:
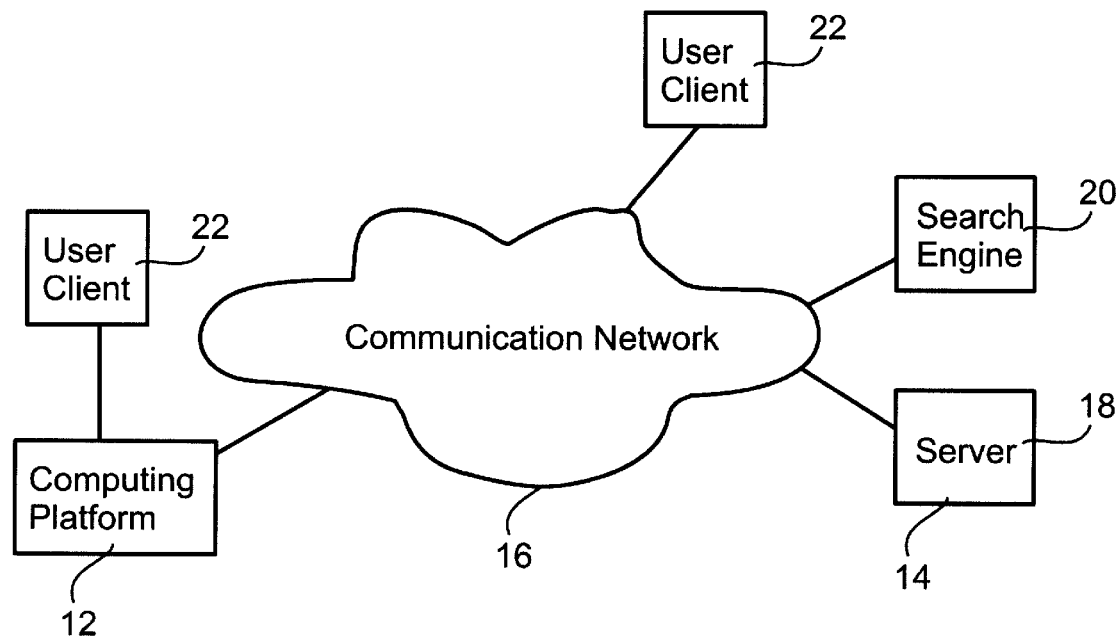

As shown in FIG. 1b and according to another aspect of the present invention, system 10 can be utilized to preview contents of electronic files which are stored by at least one additional computing platform 14 being in communication with computing platform 12.

Such communication is preferably mediated via a communication network 16 although direct communication via wire or wireless means is also envisaged by the present invention.

As used herein, the phrase "communication network" preferably refers to the Internet as manifested by the World Wide Web (WWW) of computers, although the system of the present invention can also be implemented within Intranets or Extranets or any other open or closed communication network.

Computing platform 14 can be a server 18 storing the content of Web files including, but not limited to, Web pages and files such as MP3, MPEG, AVI, WAVE, JPG, GIF, HTML, XML, WML, Windows Media, Real Networks, or QuickTime which are accessible/downloadable through a Web address provided for example as a search result.

As used herein the term "server" refers to a computing platform, such as a personal computer, workstation mainframe etc capable of processing, storing and preferably communicating information over a communication network such as the Internet.

As used herein, the phrase "Web page" refers to any document written in a mark-up language including, but not limited to, HTML (hypertext mark-up language) or VRML (virtual reality modeling language), dynamic HTML, XML (extended mark-up language), WML, or related computer languages thereof, as well as to any collection of such documents reachable through one specific Internet address (e.g., Web address) or at one specific World Wide Web site, or any document obtainable through a particular URL (Uniform Resource Locator).

Alternatively, computing platform 14 can be a user client, the contents of which are indexed by a searchable server 20 (e.g., NAPSTER-like or HOTLINE-like configuration) which is in communication with computing platforms 12 and 14 through communication network 16.

System 10 of the present invention can autonomously generate previews of any Web files specified by a Web address. For example, a user surfing the Web can be presented with previews of hyperlinks embedded in a Web page. This enables a user to preview the contents of Web pages without having to actually access these Web pages.

System 10 can also generate previews of Web files which are uncovered by a search performed by a search engine application. Such a search engine application can be operated by computer platform 12 or a search server communicating therewith.

In any case, search results (e.g., hyperlinks) which are generated by the search engine in response to a search query performed by a user operating user client 22 are accessed by computing platform 12 and the content (preferably source code) of each corresponding Web file is imported (sequentially or simultaneously) by a Web engine application capable of importing such content.

Following import, the source code of the Web file is processed by the previewing application to thereby generate the preview of the Web file as described hereinabove and further exemplified below.

Preferably, a Web page interface is maintained and provided by computing platform 12. Such an interface allows a user of user client 22 operating, for example, a Web browser application, to submit a search query and to receive the previews of search results.

A detailed description of the Web page search embodiment of the present invention is provided in the Example which follows.

As used herein, the phrase "Web browser" or the term "browser" refers to any software application which can display text, graphics, or both (using built in features or dedicated plug-ins), from Web pages on World Wide Web sites. Examples of Web browsers include, Netscape navigator, Internet Explorer, Opera, iCab and the like.

Thus, system 10 of the present invention is capable of providing a user with a preview presenting a content of a Web file, the link of which is provided as a search result generated by a search engine application.

It will be appreciated that such search results can be presented in addition to hyperlinks or as an alternative to hyperlink results generated by the search engine application.

In the case of a Web page search result and in other applications, the preview generated is preferably a scaleable thumbnail image of the Web page pointed to by that link including activatable hyperlinks embedded therein. In the case of a Web file search result, such as an MP3 file, the preview generated preferably includes at least a portion of the music (possibly in a reduced audio quality) represented by the MP3 file, in an audio format which is preferably playable by a Web browser (e.g., WAVE, QuickTime, MP3, Real Audio, media player, Windows Media, etc.).

System 10 of the present invention can also generate previews of Web files which include other sensory information content.

A current and developing Internet trend is to add additional sensory information to Web files such as Web pages. For example, it is now possible to add olfactory information to a Web page such that users with a dedicated device containing controllably releasable chemicals connected to their client can perceive such olfactory information. In such cases, a preview of a Web page can also include at least a portion of such olfactory information.

Thus, system 10 of the present invention generates a database of previews which "mirrors" at least a portion of the content of various Web files.

Such previews are preferably stored by computing platform 12 or by any additional computing platform which forms a part of system 10.

According to another aspect of the present invention there is provided a preview database which can be accessed by users communicating with system 10, thus negating the need to re-generate the previews each time they are needed.

Such a preview database can be searched according to an index, keywords, Web page addresses, popularity of Web pages etc.

It will be appreciated that since the previews stored in the database of the present invention must reflect the present content state of a specific Web page, such previews are automatically and constantly or periodically updated by, for example, comparing the "last modified" date of a Web page to a generation date of a preview, by updating previews which are requested most often, or by updating previews maintained longer than a predetermined time period.

Since the database of the present invention enables viewing of Web file previews without having to actually access and/or retrieve the Web files, it provides numerous advantages to a user. It enables "off-line surfing" of Web file content without having to actually link to, or download such files and in addition it provides a rapid and efficient method of previewing the content of such Web files. This is especially important in cases of Web pages which are stored by Servers which communicate through narrow bandwidths or which are overloaded and as such down or inaccessible and therefore are oftentimes difficult or impossible to access.

In addition, in cases of large Web files such as music files (e.g., MP3), movie files (e.g., QuickTime) or FLASH rich Web pages, the present invention enables a user to preview the content of the file without having to download the file which can be several Megabytes in size and therefor can take several minutes or more to download.

The database of the present invention preferably provides a user with hyperlinks to the Web file from which the preview was generated and/or to additional related Web files, information relating to the accessibility of the Web file, the date it was last modified, to the bandwidth through which the server storing the Web file is communicating with a communication network and any statistical information relating to previews.

It will be appreciated that the system of the present invention can be utilized to generate the preview database described above in one or more user clients according to searches effected by user(s) thereof. In this case, a user can maintain previews of Web files searched thereby and in addition share such previews with other users communicating therewith either directly or though the system of the present invention. For example, a specific user query submitted to the system of the present invention can be used to query previews stored by one more user client. This feature of the present invention enables the generation and maintenance of a large preview database which is dispersed among user clients thus negating the need for maintaining a single database in a specific location.

Thus, the present invention provides a database and system utilizing same which enable rapid and accurate searching through, for example, Web pages/files while enabling a user to determine, without downloading or accessing specific Web files, the accuracy, relevancy, quality and/or general content of the results returned in response to a search query.

In addition, the present invention enables a user to preview a specific Web file even in cases where such a Web file cannot be accessed or downloaded on-line.

Additional objects, advantages, and novel features of the present invention will become apparent to one ordinarily skilled in the art upon examination of the following example, which are not intended to be limiting. Additionally, the various embodiments and aspects of the present invention as delineated hereinabove and as claimed in the claims section below finds experimental support in the following example.

EXAMPLE

Reference is now made to the following example, which together with the above descriptions, illustrate the invention in a non limiting fashion.

Presentation of Web Page Search Results

A Web site has been created which permits rapid searching of Web page/file information (http://www.seek2c.com, the content of which is incorporated herein by references). This Web site has been created to facilitate accumulation of data and was kept confidential from the general public prior to filing of the instant application.

The Web site generated, enables a user communicating therewith to search for Web page information according to user specified keywords and to view previews of Web page content as search results.

Figure 2:
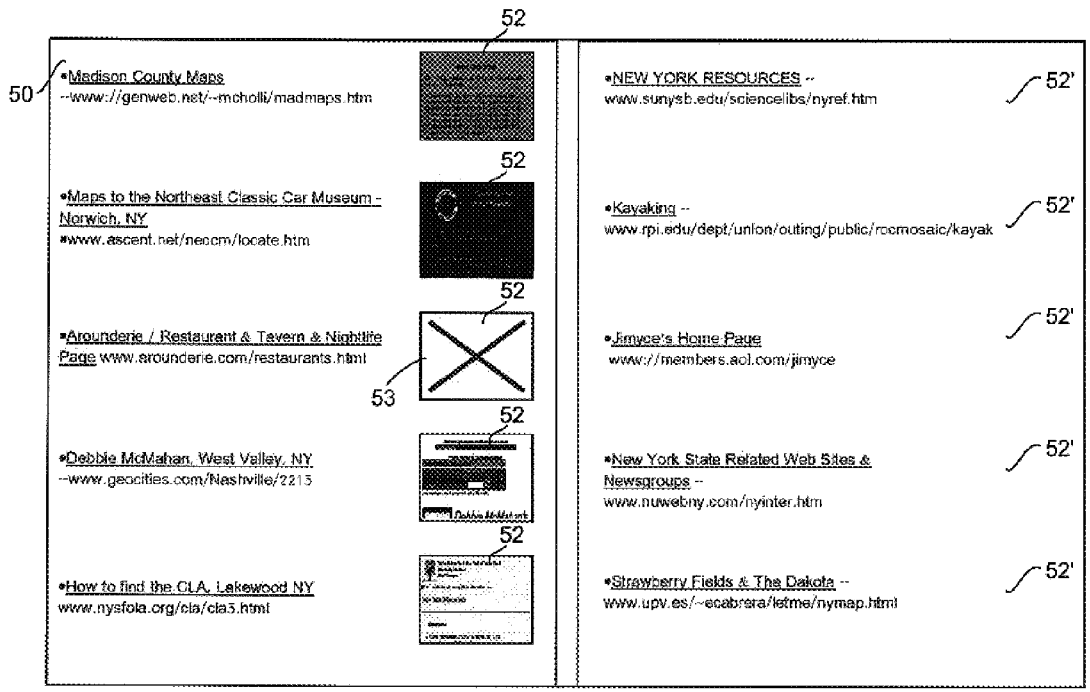

For example, and as specifically shown in FIGS. 2–9, a search query including the terms "NY and "maps" returns a list of links 50 each including a title and a Web address, and a corresponding thumbnail image 52 which represents at least a portion of the content of the Web page corresponding to the link (FIG. 2). Any "broken" or inaccessible links are represented by image 53. Images 52' represent previews which are in the process of generation/loading.

The system of the present invention generates the preview page by:
(i) using propriety or commercially available search engine software to search the World wide and obtain link information for Web pages relevant to the search query; (ii) using a Web spider to link to the relevant Web pages and to sequentially or simultaneously access and import their content; (iii) generating a preview image from some or all of the content imported; and (iv) displaying a thumbnail of the preview in a search result list.

The preview is preferably generated in real time following query submission, although in cases where a Web site is inaccessible at the time of searching, preview generation can be effected at a later point and the preview stored for future reference.

In cases where a preview file for a particular search has been previously generated and stored in the database, the content of this file may be compared to that of the actual Web page during the search, updated if needed, and presented in the search results.

Figure 3:
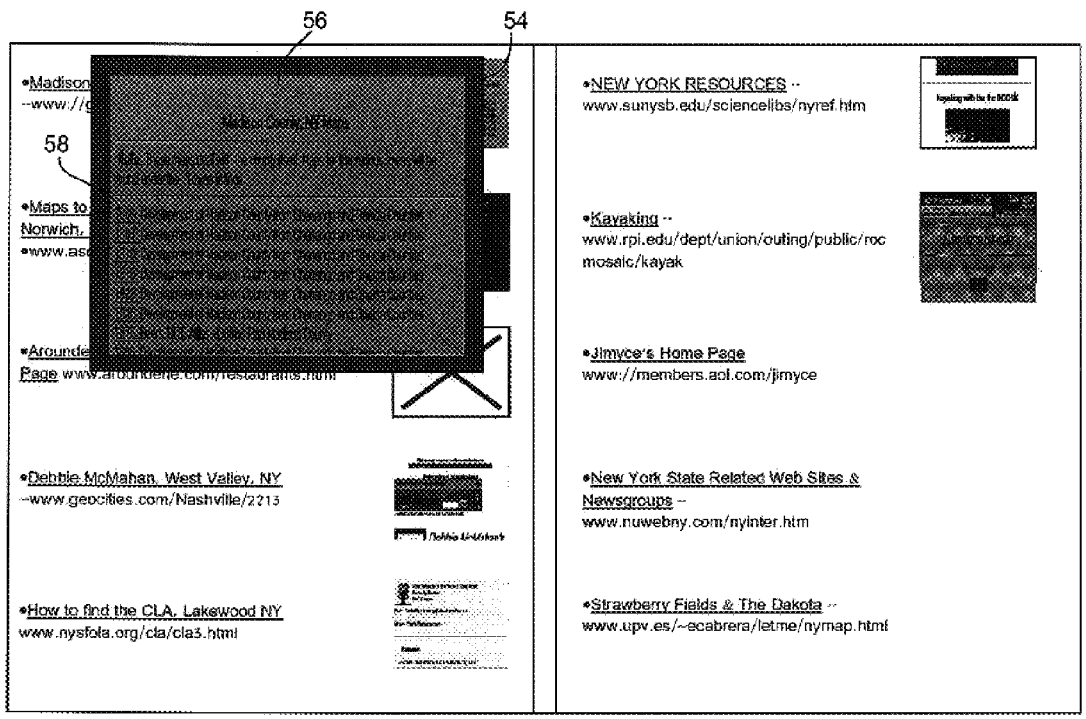

As shown in FIG. 3, by specifying a mouse or keyboard command, the user can enlarge preview 54 (resulting in preview 56) in order to better perceive its contents; this enables more efficient screening of the relevance of this preview result.

Figure 4:
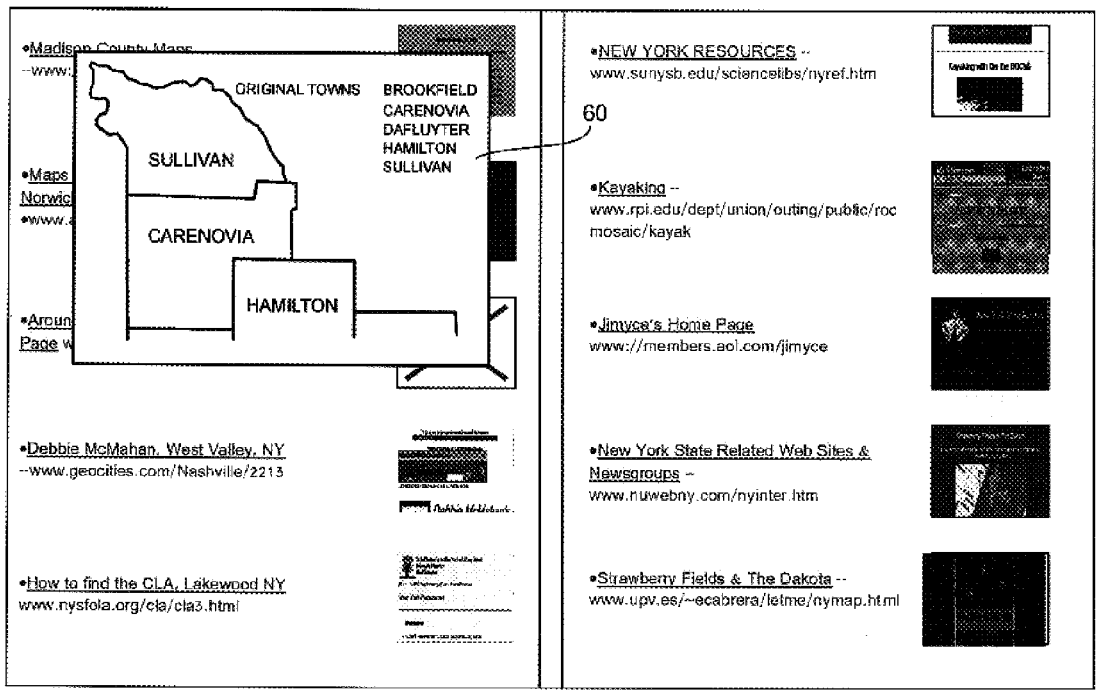

Activating link 58 embedded within preview 56 generates a preview 60 of the Web page represented by this link (FIG. 4).

Preview 60 is generated as a cascading window within the results page shown in FIG. 2, thus allowing the user to remain within this page and to have instant access to all of its displayed previews.

Figure 5:
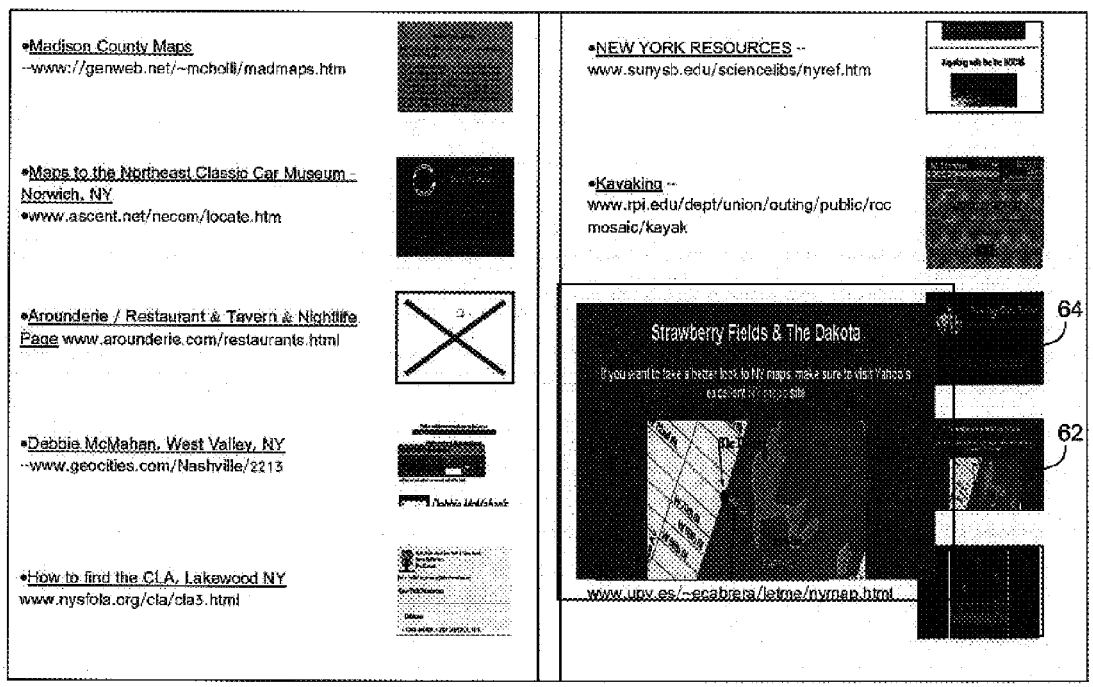
Figure 6:
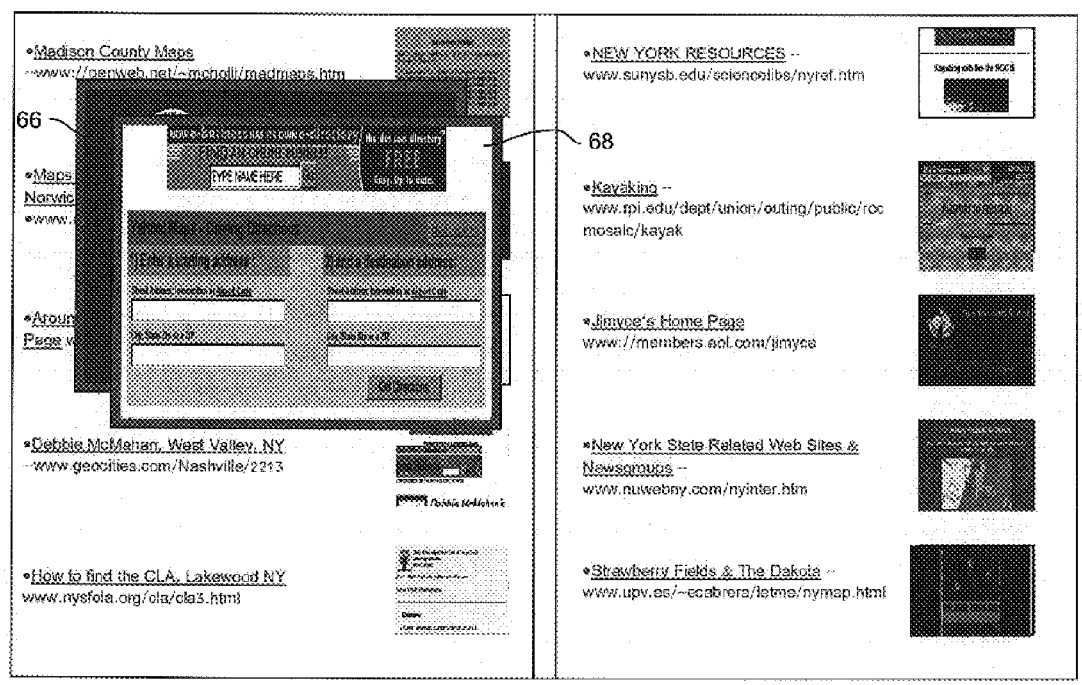

If a user decides that preview 60 is not relevant, then preview 62 from the results list can be activated to generate magnified preview 64 (FIG. 5). Alternatively or additionally, preview 66 can be magnified and a link therein can be activated to generate preview 68 (FIG. 6).

Figure 7:
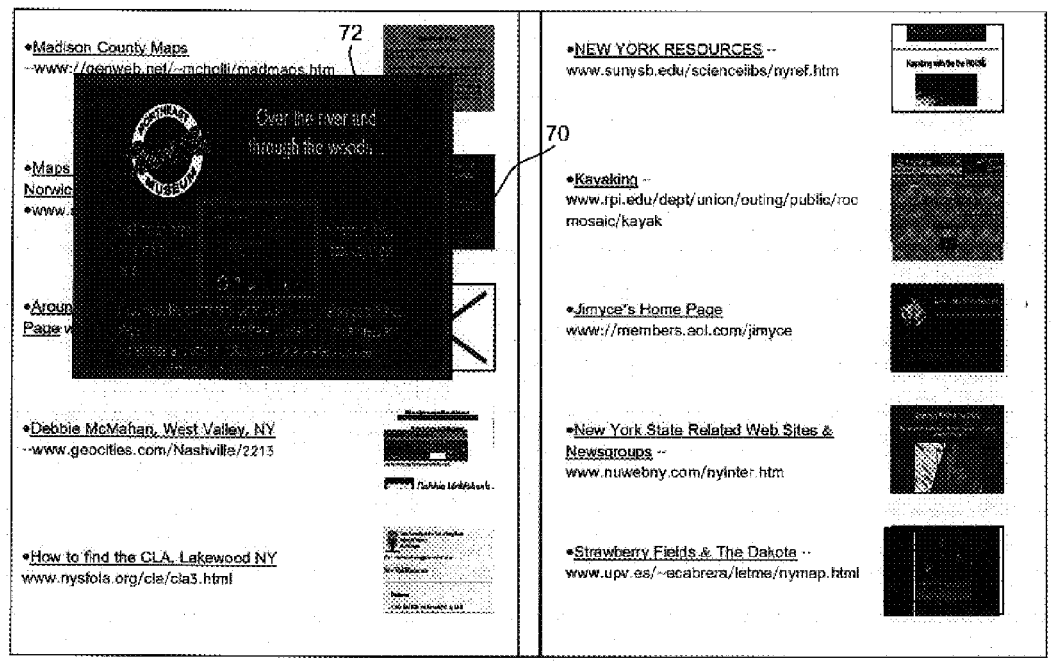
Figure 8:
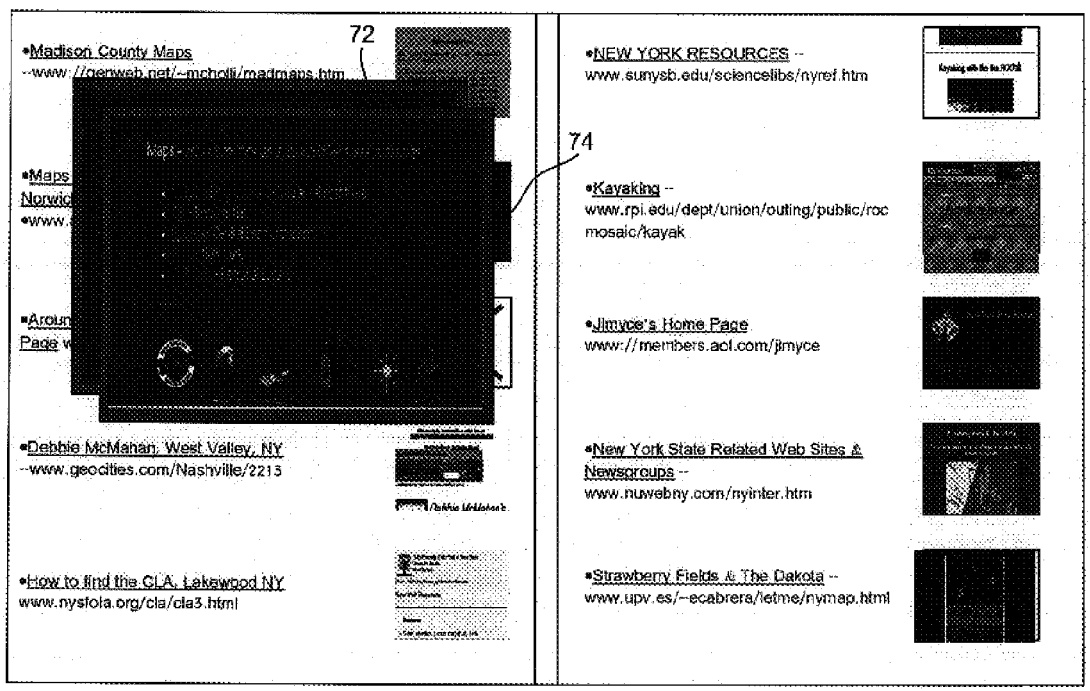
Figure 9:
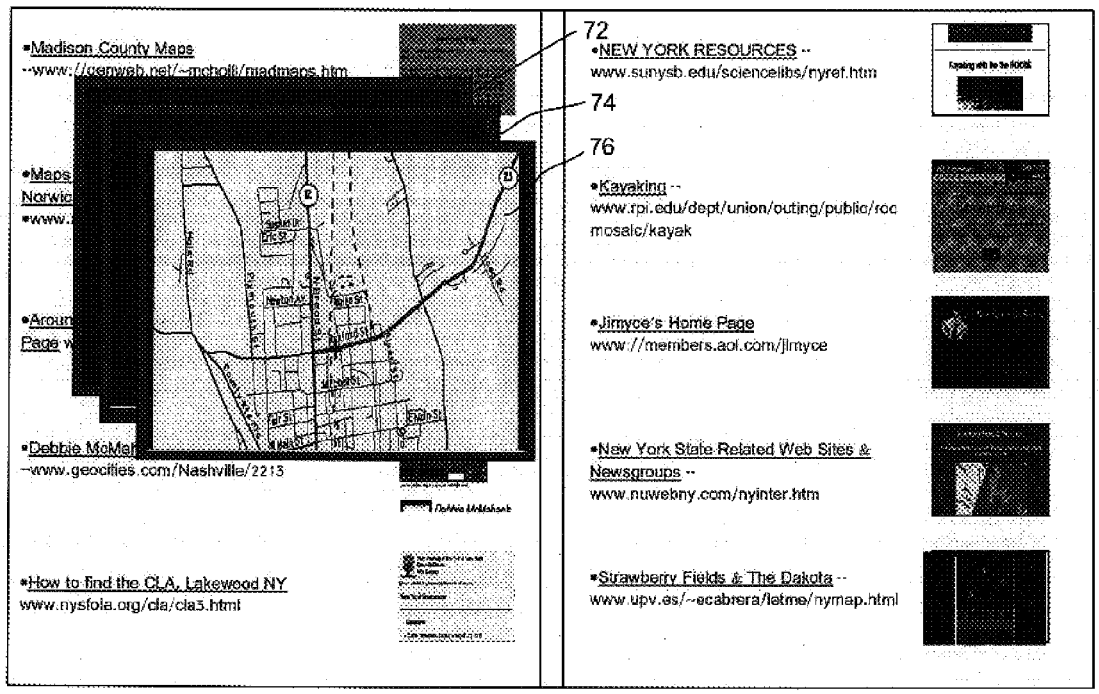

Eventually such rapid screening can yield a Web page of interest as is shown in FIGS. 7-9 which illustrate the magnification of preview 70 and the sequential activation of links embedded within previews 72 and 74 which result in preview 76 which represents a map of interest.

Following such screening the user can access the Web page represented by any preview via a simple mouse or keyboard command.

These previews were generated as images encoded in a flash file format. By using the Microsoft Internet Explorer engine (mshtml.dll, etc), the HTML page being previewed was parsed and rendered and disassembled into it's basic elements including text, links, images, buttons, flash animations, audio sounds, scripts, java applets, tables, etc.

For each basic element, a corresponding flash element was inserted into the flash preview file. For example, a flash text element was inserted into the flash preview file for each HTML text element of the original HTML page. These elements were formatted into the appropriate shape and size and inserted in the corresponding locations in the flash preview file. The elements.

HTML elements which did not have corresponding flash elements (for example: Java Applets) were rendered and then photographed. Their picture was sized and inserted into the flash preview file in the corresponding location.

Any audio content in the original web page being previewed is re-recorded in a reduced audio quality (so as to be of a smaller file size) and it also added to the generated preview. At present, there are available several commercial, shareware and freeware applications which can be used for such audio sampling.

Activatable links embedded within the image previews can be generated via, for example, the use of image maps or flash files. Image maps are areas on an image that activate a function when clicked (or even touched by the mouse pointer). Flash files are versatile video/audio files that can be displayed by most Web browsers and can incorporate images, buttons, scripts, animation, sounds, and programming commands.

To accurately represent the activatable links within the generated preview the following guidelines are followed.

The size and location of some or all of the links and buttons in the original web page should be determined (possibly by rendering the original web page first); then, for each such link or button in the original web page, a "hot spot" should be embedded inside the image preview (hot spots are areas on the image that activate a specified function and/or URL when clicked on).

Preferably, each hot spot placed in the image preview should be placed in the location on the image preview that corresponds to the original location of the link/button on the web page being previewed. In addition, each hot spot should have a size and shape which corresponds to that of the link/buttons of the original web page.

Furthermore, a JavaScript function may be associated with each such hot spot, or the hot spot may have a URL associated with it thus causing a second preview to be generated when the hot spot is activated.

When using flash files to generate the activatable links embedded inside the image previews the size and location of some or all of the links and buttons in the original web page should be determined (possibly by rendering the original web page first). Then, for each such link or button in the original web page, a corresponding flash button should be embedded inside the image preview.

Preferably, each flash button placed in the image preview should be placed in a location on the image preview which corresponds to the location of the original link/button. In addition, each flash button placed in the image preview should have a size and shape which corresponds to that of the original link/button.

A script function may be associated with each flash button, or the flash button may have a URL associated with it.

A preview for Web pages represented by embedded links can be generated as described above thus forming a cascade of previews (nested previews), or if so desired the user can access the actual Web page represented by the link.

It will be appreciated that the generation of such preview cascades is particularly advantageous since it allows the user to preview a Web page which is several links away from the Web page returned by the search.

In any case, the system of the present invention enables a user to access preview information on any link, either embedded in a preview or presented in an actual Web page accessed by the user.

For this example, the preferable system architecture will now be described. It is to be understood that many other possible system architecture exists, and the following architecture is given as an example only, and is not intended to be limiting.

A "preview server" should be set up. This "preview server'" should be running a web server, a database, a web spider, and a preview generator.

Preview requests can be made to the web server by using standard HTTP get requests (in most cases these requests will be made by the users web browser). The web server processes all such requests and attempts to retrieve the requested preview from the database. If the preview is not in the database, then the web server requests the preview from the preview generator. The preview generator then uses the web spider to download the web page being previewed, it then generates the preview (in the manner explained above), and it then stores the preview in the database. The web server then returns the requested preview to the requesting client.

With this architecture, previews can easily be added to any web page (and specifically to web pages that contain search result lists) very easily. This is done by embedding URL's that point to the desired previews on the preview server into the HTML of the web page.

For this example, a user might query a search engine, and get back a search result list with the URL's for the previews of the web pages in the search result list embedded into the HTML of the search results web page. The users web browser would then automatically retrieve the search result previews from the preview server and display them.

Another possible architecture could be to have the user query the preview server directly. The preview server should then pass the users query to one or more search engines. The preview server should retrieve the search results list from the search engines, should then add the previews to the search results list, and should then return the search results list (with the previews) to the user.

Yet another possible architecture could be to combine the preview server and the search engine into a single server.

Even yet another architecture could be for the users client to perform the search and generate the search results list by itself, without using a search engine, and to then access the preview server in order to get the previews for the search results list.

Even yet another architecture could be for the users client to perform the search using a search engine, and to then generate the previews by itself (in the manner explained above) without using a preview server.

Even yet another architecture could be for the users client to both perform the search by itself (without using a search engine), and to then generate the previews by itself (in the manner explained above) without using a preview server.

Many more possible architectures will be apparent, after reading this description, to a person with ordinary skill in the art. All such architectures are also intended to be covered by this patent.

It is appreciated that features described only in respect of one or some of the embodiments are applicable to other embodiments and that for reasons of space it is not possible to detail all possible combinations. Nevertheless, the scope of the above description extends to all reasonable combinations of the above described features.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for previewing contents of Web files, the system comprising a computing platform for executing a previewing application being designed and configured for:
   (a) retrieving at least a portion of a content and/or a source code of a Web page; and
   (b) generating an image preview of said content and/or said source code of said Web page, said preview presenting at least a portion of said content of said Web page, wherein said at least a portion of said content and/or said source code of said Web page is converted from a first file type to a second file type prior to, during or following said generating said image preview; and wherein at least a portion of said image preview is in a vector format.

2. The system of claim 1, further comprising a server being for providing a link to said Web page.

3. The system of claim 2, wherein said link is a hyperlink representing a Web address of said Web page.

4. The system of claim 2, wherein said server employs a search engine application and further wherein said hyperlink is presented thereby as a result of a search query.

5. The system of claim 1, further comprising at least one additional computing platform being capable of accessing and optionally displaying said image preview generated by said computing platform.

6. The system of claim 1, wherein said image preview is scaleable without substantial loss of quality.

7. The system of claim 1, wherein said image preview includes activatable links embedded therein.

8. The system of claim 7, wherein said activatable links are hyperlinks.

9. The system of claim 1, wherein said Web page is stored by at least one additional computing platform capable of communicating with said computing platform.

10. The system of claim 1, wherein said computing platform is further designed and configured for storing said image preview generated thereby.

11. The system of claim 1, wherein said at least a portion of said content and/or said source code of said Web page is retrieved from at least one user client communicating with said computing platform.

12. The system of claim 1, wherein said at least a portion of said content and/or said source code of said Web page is retrieved from a server being in communication with said computing platform.

13. The system of claim 1, further comprising at least one additional computing platform being in communication with said computing platform, said at least one additional computing platform storing links to said Web pages.

14. The system of claim 13, wherein said at least one additional computing platform executes a search engine application capable of providing said links to said Web pages as part of a search result list.

15. The system of claim 13, wherein said at least one additional computing platform is a server or a user client.

16. A method of previewing contents of a Web page comprising:
   (a) retrieving at least a portion of a content and/or a source code of the Web file; and
   (b) generating an image preview of said content and/or said source code of the Web page, said preview presenting at least a portion of said content, wherein said at least a portion of said content and/or said source code of said Web page is converted from a first file type to a second file type prior to, during or following said generating said image preview; and wherein at least a portion of said image preview is in a vector format.

17. The method of claim 16, wherein step (a) is effected by linking to said Web page via a link thereof and downloading said contents and/or said source of said Web page.

18. The method of claim 17, wherein said link is included in a results list of a Web search.

19. The method of claim 16, wherein said image preview is generated in a manner enabling embedding of activatable links therein.

20. The method of claim 19, wherein said activatable links are hyperlinks.

21. The method of claim 16, wherein said image preview includes an activatable link to said content of the Web page.

22. The method of claim 16, wherein said image preview is scaleable without substantial loss of quality.

23. A system enabling a user to surf the World Wide Web, the system comprising:

(a) a database server including image previews of Web pages each of said image previews presenting at least a portion of a content of a Web page, wherein said image previews are in a file format different than that of said Web pages; and wherein at least a portion of each of said image previews is in a vector format; and (b) at least one user client being in communication with said database, said at least one user client being capable of accessing and displaying each of said image previews thereby enabling a user of said at least one user client to surf the World Wide Web.

24. The system of claim 23, wherein at least one of said image previews is generated by said database server according to a user command.

25. The system of claim 23, wherein each of said image previews is scaleable without substantial loss of quality.

26. The system of claim 23, wherein each of said image previews includes an activatable link embedded therein.

27. The system of claim 26, wherein said activatable link is a hyperlink of a Web page.

28. The system of claim 27, wherein activation of said hyperlink results in a display of an image preview of a content of a Web page represented by said hyperlink.

29. The system of claim 27, wherein activation of said hyperlink results in access to a Web page represented by said hyperlink.

\* \* \* \* \*